United States Patent
Stellpflug et al.

(10) Patent No.: US 12,250,894 B2
(45) Date of Patent: Mar. 18, 2025

(54) MACHINE LEARNING OPTIMIZATION THROUGH RANDOMIZED AUTONOMOUS CROP PLANTING

(71) Applicant: Deere & Company, Moline, IL (US)

(72) Inventors: Michael D. Stellpflug, Cary, NC (US); Angela L. Bowman, Waukee, IA (US)

(73) Assignee: DEERE & COMPANY, Moline, IL (US)

( * ) Notice: Subject to any disclaimer, the term of this patent is extended or adjusted under 35 U.S.C. 154(b) by 864 days.

(21) Appl. No.: 17/408,398

(22) Filed: Aug. 21, 2021

(65) Prior Publication Data
US 2023/0054908 A1    Feb. 23, 2023

(51) Int. Cl.
*A01B 69/04*    (2006.01)
*A01C 7/06*    (2006.01)
(Continued)

(52) U.S. Cl.
CPC ............ *A01B 69/008* (2013.01); *A01C 7/06* (2013.01); *A01C 21/005* (2013.01);
(Continued)

(58) Field of Classification Search
CPC ..... A01B 69/008; A01B 69/007; A01B 69/00; A01C 7/06; A01C 7/00; A01C 21/00;
(Continued)

(56) References Cited

U.S. PATENT DOCUMENTS

| | | |
|---|---|---|
| 10,123,474 B2 | 11/2018 | Freiberg et al. |
| 10,430,708 B1 | 10/2019 | Hu et al. |
| (Continued) | | |

FOREIGN PATENT DOCUMENTS

| | | |
|---|---|---|
| AU | 2015268699 B2 | 12/2016 |
| WO | WO2019032648 A1 | 2/2019 |
| WO | WO2020106894 A1 | 5/2020 |

OTHER PUBLICATIONS

Alagumurthi, N. et al., "Optimization of Grinding Process Through Design of Experiment (DOE)—A Comparative Study," Materials and Manufacturing Processes, vol. 21, Iss. 1, Feb. 7, 2007, pp. 19-21.
(Continued)

*Primary Examiner* — Christopher J. Novosad
(74) *Attorney, Agent, or Firm* — Fenwick & West LLP (57) ABSTRACT

Systems and methods automate the design and execution of randomized experiments. Portions of a field are planted using an agricultural vehicle configured to randomly vary planting parameters when planting a portion of the field. A resulting crop outcome across each portion or sub-portion of the field is observed. A training set of data is generated that includes the varied planting parameters and the associated crop outcomes for each portion of the field. A machine-learned model is trained using the training set of data and is configured to predict a crop outcome for a portion of the field based on historical and forecast conditions and a set of planting parameters applied to a portion of the field. For subsequent iterations, for a target portion of the field, the machine-learned model can be applied to identify a set of planting parameters for planting the target portion of the field to optimize a desired crop outcome.

19 Claims, 5 Drawing Sheets

(51) Int. Cl.
*A01C 21/00* (2006.01)
*A01G 25/09* (2006.01)
*A01G 25/16* (2006.01)
*A01M 7/00* (2006.01)

(52) U.S. Cl.
CPC ............ *A01C 21/007* (2013.01); *A01G 25/09* (2013.01); *A01G 25/16* (2013.01); *A01M 7/0089* (2013.01)

(58) Field of Classification Search
CPC .... A01C 21/005; A01C 21/007; A01G 25/09; A01G 25/16; A01G 25/00; A01M 7/0089; A01M 7/00
See application file for complete search history.

(56) References Cited

U.S. PATENT DOCUMENTS

| | | |
|---|---|---|
| 2011/0270529 A1 | 11/2011 | Macy |
| 2014/0297242 A1 | 10/2014 | Sauder |
| 2015/0262434 A1 | 9/2015 | Schnorbus et al. |
| 2016/0057922 A1 | 3/2016 | Freiberg et al. |
| 2018/0211156 A1 | 7/2018 | Guan et al. |
| 2018/0271015 A1 | 9/2018 | Redden et al. |
| 2019/0057461 A1 | 2/2019 | Ruff et al. |
| 2021/0059096 A1 | 3/2021 | Storm et al. |

OTHER PUBLICATIONS

Boikov, A.V. et al., "DEM Calibration Approach: design of experiment," Journal of Physics: Conference Series, Jan. 2018, pp. 1-7.
European Patent Office, Extended European Search Report and Opinion, EP Patent Application No. 20189970.5, Jan. 25, 2021, eight pages.
Extended European Search Report and Written Opinion issued in European Patent Application No. 22185832.7, dated Jan. 9, 2023, in 09 pages.

```
┌─────────────────────────────────────────────────────────────┐
│ Plant field portions using an agricultural vehicle configured to │
│ randomly vary planting parameters when planting each field portion │
│                            410                              │
└─────────────────────────────────────────────────────────────┘
                              │
                              ▼
┌─────────────────────────────────────────────────────────────┐
│     Determine crop outcomes across the field portions 420   │
└─────────────────────────────────────────────────────────────┘
                              │
                              ▼
┌─────────────────────────────────────────────────────────────┐
│  Generate a training set of data including the planting parameters │
│                    and crop outcomes 430                    │
└─────────────────────────────────────────────────────────────┘
                              │
                              ▼
┌─────────────────────────────────────────────────────────────┐
│ Training a machine-learned model with the training set of data to │
│ predict a crop outcome for a field portion based on a set of planting │
│        parameters used to plant the field portion 440       │
└─────────────────────────────────────────────────────────────┘
                              │
                              ▼
┌─────────────────────────────────────────────────────────────┐
│ For a subsequent season, for a target portion of the field, apply the │
│ machine-learned model to identify a set of planting parameters for │
│   planting the target portion for a desired crop outcome 450 │
└─────────────────────────────────────────────────────────────┘
```

FIG. 4

ME LEARNING OPTIMIZATION
THROUGH RANDOMIZED AUTONOMOUS
CROP PLANTING

TECHNICAL FIELD

The disclosure generally relates to the field of machine learning, and specifically to machine learning in autonomous crop planting optimization.

BACKGROUND

Many process controls in agriculture and agronomics involve multiple interacting factors, long latency, and high variability. As a result, using current systems, it is difficult to optimize process controls intuitively or one factor at a time. While some current systems attempt to cope with multifactorial problems, local factors, lack of parameter value independence, and overfitting make them vulnerable to extrapolation error, and are resource intensive.

SUMMARY

Systems and methods automate the design and execution of randomized experiments, the outcomes of which may be used to implement optimal planting and cultivation parameters based on experimental results and desired outcomes. In an embodiment, a field is segmented into one or more portions, different sets of planting parameters are identified and/or randomized to use during planting of one or more portions of the field, one or more portions of the field are planted based on the sets of planting parameters, crop outcomes for the one or more portions of the field are determined, and/or a set of planting parameters for a portion of the field is optimized for a subsequent iteration (or, interchangeably, "season" hereinafter) based on the crop outcomes of a preceding season using an optimization model. By designing and executing randomized experiments for a particular field, resulting optimization models may account for local field characteristics, such as soil composition and topography; user preferences, such as desired crop outcomes, experiment size, degree of experimentation; and/or jurisdictional requirements, such as crop quality, fertilizer regulations, etc. Further, through the use of randomized experiments, systems and methods may determine which planting parameters most significantly impact crop outcomes, how interactions among different planting parameters and environmental conditions impact crop outcomes, which external and/or uncontrollable factors need to be accounted for and which may be ignored, and the like.

In one embodiment, an agricultural vehicle, configured to randomly vary planting parameters when planting a field, plants portions of a field. Planting parameters may each be associated with a type, such as irrigation source, seed depth, tillage, and a value, which may be discrete, continuous, enumerated, or a combination thereof. For example, values for irrigation source may be discrete (e.g., drained wells, rainwater, surface water) and values for seed depth may be continuous (e.g., ⅛ inches, ½ inches, 1 inches, 2 inches). The agricultural vehicle may randomly vary the planting parameters in a variety of ways. A variation of the planting parameters may be evenly distributed among a range of values, distributed according to a Gaussian distribution, or the like. Further, in some embodiments, under-represented values associated with a particular planting parameter may be selected more frequently and/or less frequently than other values of the planting parameter.

For each portion of the field, a resulting crop outcome is observed or determined across the portion of the field. A training set of data is generated that comprises the varied plant parameters and the determined crop outcome for each of the portion of the field. A machine-learned model is trained with the training set of data. The machine-learned model is configured to predict a crop outcome for a portion of the field based on a set of planting parameters used to plant the portion of the field.

For a subsequent season, for a target portion of the field, the machine-learned model is applied to identify a set of planting parameters for planting a target portion of the field for a desired crop outcome. The target portion of the field may be planted using the identified set of planting parameters. In some embodiments, the target portion is planted using a set of randomly varied parameters that are based on the identified set of planting parameters. A value distribution of the planting parameters in the set of randomly varied planting parameters may be narrower than a distribution of planting parameters associated with a preceding season, wider than a distribution of planting parameters associated with a preceding season, as wide as a distribution of planting parameters associated with a preceding season, or the like. Thus, by randomly varying planting parameters and updating how they are randomized based on crop outcomes of preceding seasons, plant parameters are optimized more efficiently and tailored to particular fields.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The figures depict various example embodiments of the present technology for purposes of illustration only. One skilled in the art will readily recognize from the following description that other alternative embodiments of the structures and methods illustrated herein may be employed without departing from the principles of the technology described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that, wherever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The methods described herein use machine learning to enable a vehicle, such as an agricultural vehicle, to autonomously optimize crop planting in an environment. Examples of environments include, but are not limited to, agricultural sites or fields, forest or wooded sites, hill or mountain trails or sites, or any other location where crops may be planted. Example vehicles include tractors, transport vehicles, delivery vehicles, agricultural vehicles, or other vehicles configured to operate during crop planting. The vehicle may be an autonomous vehicle. As used herein, "autonomous" refers to the ability of the vehicle to operate without constant human supervision, for instance enabling the vehicle to move, navigate, perform a function, and/or make a decision without explicitly receiving instructions from a human operator.

Figure 1:
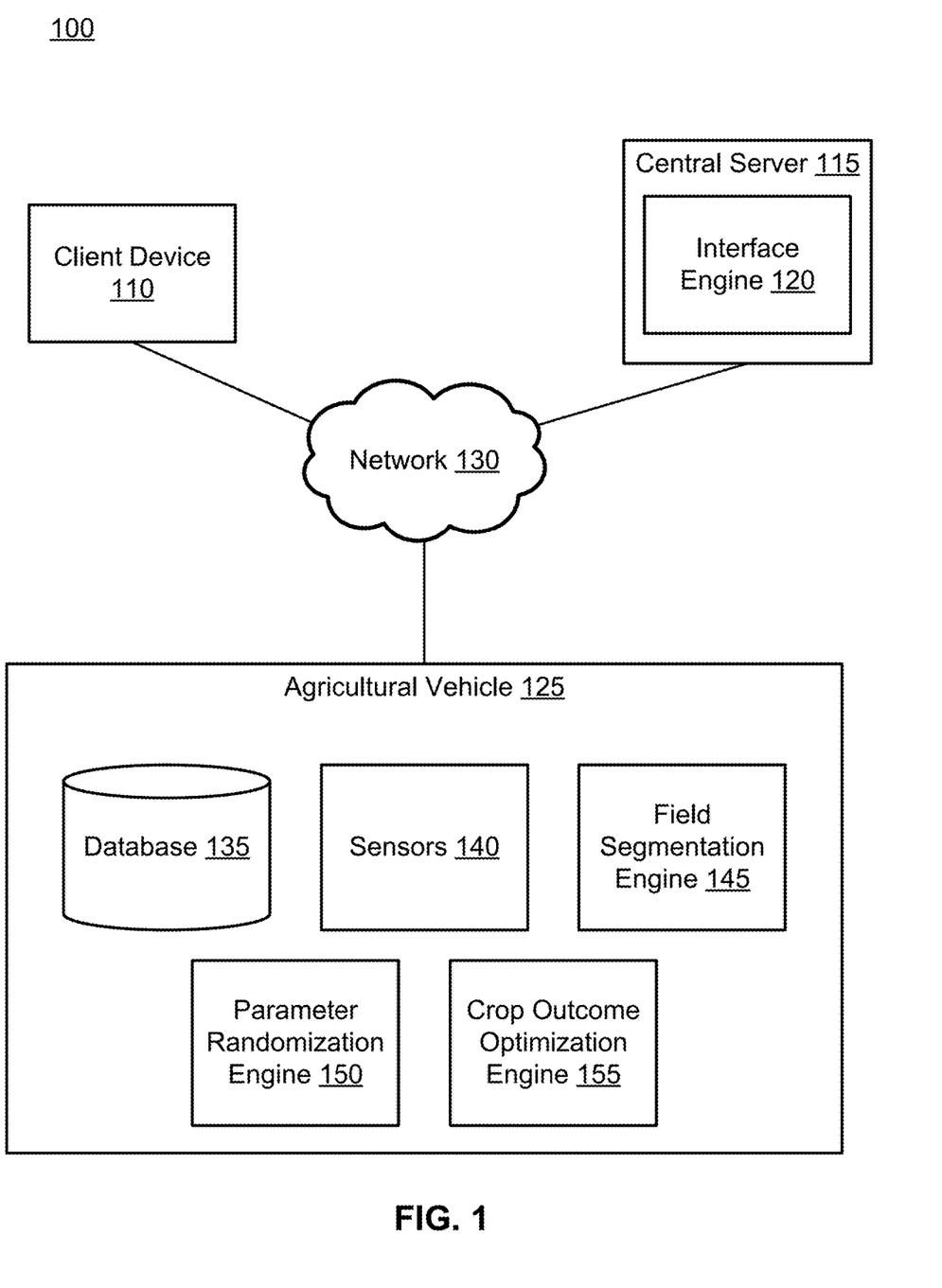
FIG. 1 illustrates an agricultural vehicle system environment, according to various embodiments.

Figure (FIG. 1 illustrates an agricultural vehicle system environment 100, according to various embodiments. The system environment 100 of FIG. 1 includes a client device 110, a central server 115 with an interface engine 120, and an agricultural vehicle 125, each communicatively coupled via a network 130. It should be noted that in other embodiments, the system environment 100 may include different, fewer, or additional components than those illustrated in FIG. 1. For instance, the client device 110 and the central server 115 may be on the same device. Additionally, the functionality of the components may be distributed in a manner different than that illustrated in FIG. 1. For example, components of the agricultural vehicle 125 may operate as standalone components, may be on the client device 110 or within the central server 115, or the like.

The client device 110 is a computing device, such as a computer, a laptop, a mobile phone, a tablet computer, or any other suitable device configured to receive information from or provide information to the central server 115. The client device 110 includes a display configured to receive information from the interface engine 120, for instance generating user interfaces that include information representative of one or more agricultural vehicles 125 or the system environment 100. The client device 110 can also generate notifications (such as notifications generated by an agricultural vehicle 125) for display to a user, such as text messages or operating system notifications. The client device 110 can include input mechanisms (such as a keypad, a touch-screen monitor, and the like), enabling a user of the client device to provide instructions to an agricultural vehicle 125, either via the central server 115 or to the agricultural vehicle 125 directly. It should be noted that although the client device 110 is described herein as coupling to an agricultural vehicle 125 via the central server 115, in practice, the client device 110 may communicatively couple directly to the agricultural vehicle 125 (enabling a user to receive information from or provide instructions to the agricultural vehicle 125 without going through the central server 115).

The central server 115 is a computing system located remotely from the agricultural vehicle 125. In some embodiments, the central server 115 is a web server or other computer configured to receive data from and/or send data to one or more vehicles, such as the agricultural vehicle 125, within the system environment 100. In some embodiments, the central server 115 receives information from the agricultural vehicle 125 and/or other vehicles indicating a location of the vehicles, a function or operation being performed by the vehicles, a state of the one or more vehicles, and the like. In some embodiments, the central server 115 receives information describing the surroundings of the agricultural vehicle 125, including, but not limited to, a temperature, humidity, topography, geography, plant imagery, and/or soil condition of a given area. In some embodiments, the central server 115 receives a real-time feed of data from the agricultural vehicle 125, such as a real-time video feed of the environment surrounding the agricultural vehicle 125. In some embodiments, the central server 115 can provide information to the agricultural vehicle 125, such as an instruction to perform an operation or function, a navigation instruction (such as a route), and the like. In some embodiments, the central server 115 can enable a remote operator to assume manual control of the agricultural vehicle 125 and provide manual navigation or operation instructions to the agricultural vehicle 125.

The central server 115 includes an interface engine 120 configured to generate one or more interfaces for viewing by a user (such as a user of the central server 115 or a user of the client device 110). The user can be a remote operator of the agricultural vehicle 125, an individual associated with the system environment 100 (such as a field worker or a landowner), an individual associated with the agricultural vehicle 125 (such as a repairman, an on-site coordinator, or the like), or can be any other suitable individual. The interface engine 120 can be used by a user to provide one or more instructions to an agricultural vehicle 125, such as planting parameter randomization instructions, field segmentation instructions, route instructions, operation or function instructions, remote piloting instructions, or the like.

The interface engine 120 can generate a user interface displaying information associated with the agricultural vehicle 125, other vehicles, or the system environment 100. For instance, the user interface can include a map illustrating a location and/or movement of each agricultural vehicle 125 within a field, how a field is segmented, which planting parameters are associated with each field portion and vehicle operation, values of planting parameters associated with each field portion, environmental data associated with the field and/or one or more field portions, etc. The user interface can illustrate a function or operation being performed by each agricultural vehicle 125 within the field, a state or characteristics of each agricultural vehicle 125 within the field, or the like. The user interface can also display notifications generated by and/or received from an agricultural vehicle 125, for instance within a notification feed, as pop-up windows, using icons within the map interface, and the like. By communicatively coupling to multiple agricultural vehicles 125, the central server 115 beneficially enables one user to track, monitor, and/or control multiple agricultural vehicles 125 simultaneously, as well as manually update data not otherwise accessible via network 130.

An agricultural vehicle 125 automates the design and execution of randomized experiments for one or more fields. The agricultural vehicle 125 may also optimize planting parameters for a subsequent season for a particular field and one or more desired crop outcomes based on the experimental results. The agricultural vehicle 125 may identify and/or randomize different sets of planting parameters to use during planting of the one or more portions of the field. The agricultural vehicle 125 may also plant the one or more portions of the field based on the sets of planting parameters and/or determine crop outcomes, targets of interest, or endpoints (simply "crop outcomes" hereinafter) or the one or more portions of the field. In addition, the agricultural vehicle 125 may optimize a set of planting parameters for a portion of the field for a subsequent season based on the crop outcomes of a preceding season. In some embodiments, the agricultural vehicle 125 may segment the field into one or more portions. Segmentation may be based on characteristics of the field, experiment size, experiment design, etc. Alternatively, or additionally, the agricultural vehicle 125 may receive instructions from one or more components communicatively coupled to the agricultural vehicle 125, such as the client device 110 and/or central server 115. Instructions may include segmentation instructions, planting parameter randomization instructions, optimization instructions, or the like. It should be noted that any of the computational, analytical, or planning tasks described herein as performed by the agricultural vehicle 125 (such as the design and execution of randomized experiments) may instead be performed by the central server 115 in various embodiments.

The agricultural vehicle 125 illustrated in FIG. 1 includes a database 135, sensors 140, a field segmentation engine 145, a parameter randomization engine 150, and a crop outcome optimization engine 155. In other embodiments, the agricultural vehicle 125 includes fewer, different, or additional components than those illustrated in FIG. 1. Other components, such as engines, drivetrains, communication components, or the like, are not illustrated for the purposes of simplicity. In addition, the functionality of the components may be distributed in a manner different than prescribed. For example, the crop outcome optimization engine 155 may operate independently from the agricultural vehicle 125, be located within the central server 115, etc.

The agricultural vehicle 125 may store field data, environmental data, historical data, machine data, planting parameters, crop data, crop outcome data, one or more models, training data, testing data, validation data, user data, etc., in one or more databases, such as database 135. Data may be generated from one or more sensors 140, the field segmentation engine 145, the parameter randomization engine 150, and/or the crop outcome optimization engine 155. In addition, data may be accessed from one or more components of the system environment 100 communicatively coupled to the agricultural vehicle 125, such as the client device 110 or central server 115 or related external operations and databases. In some embodiments, the data stored in the database 135 may be stored in a remote location. Further, while one database 135 is shown, the agricultural vehicle 125 may include multiple databases. Data stored in the database 135 may be captured manually, automatically, at a predetermined frequency (hourly, daily, weekly, monthly, seasonally, yearly, etc.), upon a push from a user of the system environment 100, or the like.

Field data describes the state of one or more fields and/or field portions. Field data may include, but is not limited to, data describing field size, field location, soil composition, soil moisture, field geometry, field geography, field topography, weed species, sloping angle, sun exposure, proximity to natural and/or unnatural irrigation sources, number of field portions, locations of field portions, geometry of field portions, number of end rows, location of end rows, number of crop types, crop types (e.g., row crops, agronomic crops, horticultural crops, field crops, specialty crops, annual crops, perennial crops, etc.), foliage, or the like. Field data may include present field data, historical field data, and/or forecasted field data.

Environmental data describes one or more environmental conditions or states of an environment in which a field or portion of a field is located. Environmental data may include, but is not limited to, pressure data, temperature data, humidity data, climate data, geography data, light intensity data, or the like. Environmental data may include present environmental data, historical environmental data, and/or forecasted environmental data. Environmental data may be aggregated over any suitable region, based on location (e.g., field portions, fields, cities, states, etc.), climate (tropical, semi-arid, desert, etc.), jurisdictional restrictions, or the like.

Machine data includes data associated with machines that are used to plant one or more fields. Machine data may include, but is not limited to, data describing the makes and/or models of one or more machines, machine types, available machine functionality, logs of machine activity, operator data, or the like. Machine data may also include historical fleet data and/or historical operation data.

Planting parameters are control factors used by the agricultural vehicle 125 to plant a field. Planting parameters may include, but are not limited to, row spacing, cover cropping, seed depths, amount of fertilizer, amount of herbicide, amount of pesticide, seed type, seed rate, tillage depth, tillage tool, tillage intensity, amount of irrigation, source of irrigation, harvest intensity, timing of each operation, bypassing planting altogether, grazing animals, or the like. Planting parameters may be associated with different environments, entities, seasons, processing stages, or the like. For example, a set of planting parameters for planting corn in Iowa on a 100 acre farm may be different than a set of planting parameters for planting coffee plants in Guatemala on a 50 acre farm. In addition, planting parameters may be associated with one or more levels and/or values. The levels and/or values of the planting parameters may be discrete, continuous, or a combination thereof. For example, a row spacing planting parameter may be associated with multiple row spacing levels, such as 20 inch row spacings, 24 inch row spacings, 30 inch row spacings, etc. As another example, a tool type may be associated with discrete values and an amount of herbicide may be associated with continuous values. The types, levels, and/or values of the planting parameters may be determined by one or more components of the agricultural vehicle 125, discussed below. In some embodiments, the agricultural vehicle 125 receives information about planting parameters (e.g., type, levels, values, etc.) from one or more users of the system environment 100, the central server 115, or a different component of the system environment 100.

Crop outcome data describes the results of an agricultural season, processing step, year, or the like. Crop outcome data may include, but are not limited to, a yield, a yield rate, a cost to plant, an amount of fertilizer used, an amount of herbicide used, an amount of pesticide used, an amount of irrigation used, a time to harvest, a soil condition, a nitrogen efficiency, an environmental impact, a crop quality (size, shape, composition, etc), a profit or revenue (per season, per plant, etc.), a foliage, a kernel size, a length and/or height of cut, a water quality, or the like. Crop outcome data may be data associated with one or more portions of a field, one or more fields, one or more entities, etc. In addition, crop outcome data may be associated with a planting season, growing season, harvesting season, quarter, year, or the like. The frequency of crop outcome data collection may vary based on the planting parameters used, crop type, user preferences, processing stage, season, or the like. For example, crop outcome data may be collected hourly, weekly, annually, etc.

The one or more models stored in the database 135 may include one or more segmentation models used to segment the field into portions, one or more parameter randomization models to used randomize planting parameters for different portions of a field, one or more crop outcome optimization models to identify a set of planting parameters for crop outcome optimization, or the like. Models may be machine-learned models, statistical models, or any other suitable model. Examples include, but are not limited to, linear regression models, logistic regression models, random forest classifiers, neural networks, ANOVA, principal component analysis, decision trees, support vector machines, boosting for other algorithms (e.g., AdaBoost), clustering models, naïve Bayes classifiers, memory based learning, bagged trees, boosted stump, ensemble combinations thereof, etc.

Training, testing, and/or validation data is used to train, test, and/or validate one or more models used by the agricultural vehicle 125. Training, testing, and/or validation data may include planting parameters from one or more seasons, corresponding crop outcomes from the one or more seasons, environmental data, machine data, field data, or the like. In some embodiments, data may be labeled. Labels may indicate a crop outcome, one or more parameters, field conditions, machine conditions, field locations, entities associated with the field, etc. In some embodiments, labels indicate a desired crop outcome associated with a field or field portion. When data is labeled, one or more crop outcome optimization models may be trained using supervised and/or semi-supervised learning. In some embodiments, a portion of the data is unlabeled. Accordingly, one or more crop outcome optimization models may be trained using semi-supervised and/or unsupervised learning.

In addition, training, testing, and/or validation data may be individualized. Training, testing, and/or validation data may be individualized by location, region, entity, crop type, topography, machine equipment, jurisdictional requirements (e.g., quality/grading requirements), crop outcome, etc. In some embodiments, training, testing, and/or validation data are updated manually, updated at a predetermined frequency (e.g., every week, every season, etc.), updated in response to a push from a user of the system environment 100, or the like. In some embodiments, one or more models stored in the database 135 may be retrained when data are updated if appropriate statistical adjustments are made to compensate for the update itself.

User data may include data describing entities associated with a field, such as landowners, employers, employees, contractors, etc. User data may include information about fields associated with each user, such as the number of fields managed and/or worked on by the user; the size of the fields; the location of the fields; the crops typically grown by the user; expected and/or average revenue, costs, and/or profits per field; or the like. User data may also include data describing user preferences associated with designing and executing field experiments, such as preferred experiment size, degree of experimentation, preferred number of sample replicates, etc. User data may also include user preferences regarding desired crop outcomes, such as which crop outcomes the user prioritizes, relative weights of prioritized crop outcomes, or the like.

The agricultural vehicle 125 may include sensors 140 to capture information representative of a field being planted and/or the surrounding area. Sensors 140 configured to capture information representative of a field being planted may include, but are not limited to, temperature sensors, humidity sensors, soil pH sensors, soil moisture sensors, light intensity sensors, soil nutrient sensors, pressure sensors, carbon dioxide sensors, or the like. Sensors 140 configured to capture machine state fuel consumption, application rate, cultivation depth, seed spacing, or the like. Sensors 140 configured to capture the surrounding area may include cameras (such as a 3D camera or camera array), a LIDAR system, a RADAR system, spectrographic system, depth sensors, proximity detectors, or the like. The sensors 140 may be mounted on an external surface or appendage of the agricultural vehicle 125, located within the agricultural vehicle 125, coupled to an object or surface external to the agricultural vehicle 125, or can be mounted to a different vehicle. Data collected from one or more sensors may be stored in a database 135 of the agricultural vehicle 125 and/or in a component of the system environment 100.

The field segmentation engine 145 segments the operational area into field blocks and samples (or simply "portions" hereinafter). The field segmentation engine 145 may segment a field manually, using one or more segmentation algorithms, one or more machine-learned models, or the like. The number, size, location, and/or geometry of field portions may be based on data stored in the database 135, such as data captured by the sensors 140, environmental data, historical data, or the like. In some embodiments, the field segmentation engine 145 segments the field based on the size of the experiment and/or the region over which results will be aggregated. For example, results may be aggregated per field, per row, per region, based on field conditions (e.g., temperature, moisture, configuration, etc.) or the like. Field segmentation may also be based on available resolution of control and/or feedback, user preferences, such as a number of crops to plant, a type of crops, preferred crop location and/or crop conditions, a number of experiments to run, a number of replicate samples, or the like.

In some embodiments, the field segmentation engine 145 may segment the field based on in-field heterogeneity to control the experimental design. Accordingly, the field segmentation engine 145 may segment fields based on external and/or uncontrollable factors, such as on hill slope percentage, position in the field, surface topology, soil type, water drainage, etc. In these embodiments, the field segmentation engine 145 may identify homogenous portions of the field and segment the field based on the identified homogenous portions such that different runs of an experiment are similar and account for in-field heterogeneity. Alternatively, or additionally, the field segmentation engine 145 may segment the field across heterogenous portions such that external and/or uncontrollable factors may be ignored (e.g., hill slope percentage, position in field, etc.).

The field segmentation engine 145 may train one or more segmentation models based on segmentation data from preceding seasons, corresponding crop outcome data, corresponding desired crop outcomes, and any suitable data stored in the database 135. Accordingly, over time, the field segmentation engine 145 may segment a field differently in order to achieve a desired crop outcome.

The parameter randomization engine 150 determines how to vary planting parameters within and across portions of a field. In some embodiments, the parameter randomization engine 150 determines which planting parameters will be controlled during the experiment and the levels and/or values of the planting parameters that will be randomized. The number and type of planting parameters may be based on the number of available sample spaces, number of desired sample replicates, number of desired parameter interactions, type of crops being planted, field data, environmental data, desired crop outcomes, etc. In some embodiments, the parameter randomization engine 150 selects which planting parameters to control. In some embodiments, the parameter randomization engine 150 may provide a set of recommended planting parameters that the user may accept, reject, and/or modify, or the like. Alternatively, or additionally, a different component of the agricultural system 100 may select which planting parameters to control and/or a user may select which planting parameters to control using one or more interface elements of a user interface.

The levels and/or values of the planting parameters used in an experiment may be defined based on a safe bounds and/or factor types (e.g., discrete, continuous, enumerated, etc.) associated with each planting parameter. In some embodiments, safe bounds indicate the upper and lower bounds of values that are recommended based on environmental data, field data, jurisdictional requirements, machine constraints, etc. Safe bounds may also be based on user preferences. For example, some users may want planting parameter values to remain within a narrow range based on the user's experience during previous seasons. In contrast, some users may want to experiment with a wide range of values. Safe bounds and/or factor types may be determined by the parameter randomization engine 150, based on input from a user, accessed from one or more components of the system environment 100, or the like. The levels and/or values may also be based on the spatial and/or timing resolution of the experiment.

The parameter randomization engine 150 may use one or more models, such as one or more statistical models or one or more machine-learned models, to select which planting parameters are used in an experiment, which levels and/or values of planting parameters are used in the experiment, and/or determine how they are randomized across portions of a field. Different randomization distributions may be implemented to understand the "response surface" of interacting parameters based on previous iterations. Examples include, but are not limited, randomization distributions centered on an expected value, forced randomizations based on under-represented values, Gaussian distributions, Bernoulli distributions, binomial distributions, central composite, Box-Behnken, or the like.

The identified planting parameters and corresponding levels and/or values may be presented to a user of the agricultural vehicle 125 and/or user of the system environment 100 via a user interface. The parameter randomization engine 150 may prompt the user to confirm the identified planting parameters, levels, and/or values. The parameter randomization engine 150 may also provide one or more interface elements that may be used to add, delete, and/or modify one or more planting parameters, levels, and/or values. In some embodiments, the parameter randomization engine 150 plants field portions according to the determined planting parameters and values. In other embodiments, the parameter randomization engine 150 instructs another instance or component of an agricultural vehicle 125 to plant or cultivate the field portions, provides instructions to a user of the agricultural vehicle 125 to manually plant or cultivate field portions, or the like.

The parameter randomization engine 150 may identify optimal designs for experiments to be executed in subsequent seasons. To identify optimal designs, the parameter randomization engine 150 may refine parameter levels to be near an optimized level, extrapolate extreme optimum values, add replicates, or the like. Optimal designs may be based on experimental results from preceding seasons, including planting parameter sensitivities, strength of interactions, statistical confidences and the like, as well as forecast conditions, parameter interactions, and the like provided by outcome optimization engine 155.

The crop outcome optimization engine 155 trains, tests, and/or validates one or more crop outcome optimization models. Crop outcome optimization models may include statistical models, machine-learned models, or the like. Models may be field-specific, location-specific, outcome-specific, user-specific, or the like. The crop outcome optimization models may predict crop outcomes for different portions of a field. Crop outcomes may be predicted based on planting parameters, field data, historical data, and/or any other suitable data, such as data stored in the database 135. For example, a crop outcome optimization model may identify a likely yield rate for a portion of a field in Iowa planted with corn given a soil composition, a sloping angle of the portion of the field, and corn quality requirements. In some embodiments, one or more crop outcome optimization models are trained using the planting parameters that were used to plant field portions in preceding seasons and the resulting crop outcomes. The resulting crop outcomes may have been directly measurable (e.g., crop yield) and/or modeled (e.g., costs of inputs).

In some embodiments, one or more crop outcome optimization models identify which planting parameters should be controlled while planting a portion of a field to yield a desired crop outcome. For example, based on a desired crop outcome, a crop outcome optimization model may identify a type and amount of fertilizer, an amount of irrigation, and a seed depth that should be selected for a portion of a field with a particular topography and/or soil composition. As discussed above, desired crop outcomes may include, but are not limited to a desired yield, a desired yield rate, desired cost to plant, desired amount of fertilizer used, desired amount of herbicide used, desired amount of pesticide used, desired amount of irrigation used, desired time to harvest, desired soil condition, desired nitrogen efficiency, desired environmental impact, desired crop quality, desired profit or revenue (per season, per plant, etc.), desired water quality, time to emergence, or the like. In some embodiments, the crop outcome optimization engine 155 receives an indication of a user's desired crop outcome. For example, the crop outcome optimization engine 155 may receive an indication of a user's desired outcome via a client device 110. Alternatively, or additionally, the crop outcome optimization engine 155 may recommend a set of desired crop outcomes for a field or a portion of a field based on data stored in the database 135.

The crop outcome optimization engine 155 may also identify planting parameter sensitivities, strength of interactions between planting parameters, statistical confidences, etc. Further, the crop optimization engine 155 may adjust planting parameters for tradeoffs (e.g., cost, environment, speed). Further, the crop optimization engine 155 may use different methods to characterize the general outcome over a spatial sample, e.g. average, median, minimum, maximum, or the like.

In addition, the crop outcome optimization engine 155 may access and/or generate training, testing, and/or validation data. The crop outcome optimization engine 155 may train, test, and/or validate crop outcome optimization models with the accessed and/or generated data. Data may be generated from experimental results, measured and/or modeled crop outcomes, or the like. Data may be accessed from one or more databases of the agricultural vehicle 125, from one or more client devices 110, the central server 115, and/or any other component communicatively coupled to the crop outcome optimization engine 155 via the network 130 such as aggregate information from fleet, cooperative, consultant, manufacturer, or the like.

Training, testing, and/or validation data may include planting parameters from one or more preceding seasons, corresponding crop outcomes from the one or more preceding seasons, desired crop outcomes associated with one or more field portions, environmental data, machine data, geography data, field data, or the like. In some embodiments, data may be labeled. Labels may indicate a crop outcome, one or more parameters, field conditions, machine conditions, field locations, desired crop outcomes, etc. In these embodiments, one or more crop outcome optimization models 135 may be trained using supervised learning and/or semi-supervised learning. In some embodiments, some or a portion of the training data is unlabeled. Accordingly, one or more crop outcome optimization models may be trained using semi-supervised and/or unsupervised learning.

The network 130 may include any combination of local area and/or wide area networks, using both wired and/or wireless communication systems. In one embodiment, a network 130 uses standard communications technologies and/or protocols. For example, a network 130 includes communication links using technologies such as Ethernet, 802.11, worldwide interoperability for microwave access (WiMAX), 3G, 4G, code division multiple access (CDMA), digital subscriber line (DSL), fiber optics, etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), controller area network (CAN), local interconnect network (LIN), and file transfer protocol (FTP). Data exchanged over a network 130 may be represented using any suitable format, such as hypertext markup language (HTML) or extensible markup language (XML). In some embodiments, all or some of the communication links of a network 130 may be encrypted and/or compressed using any suitable technique or techniques.

Figure 2:
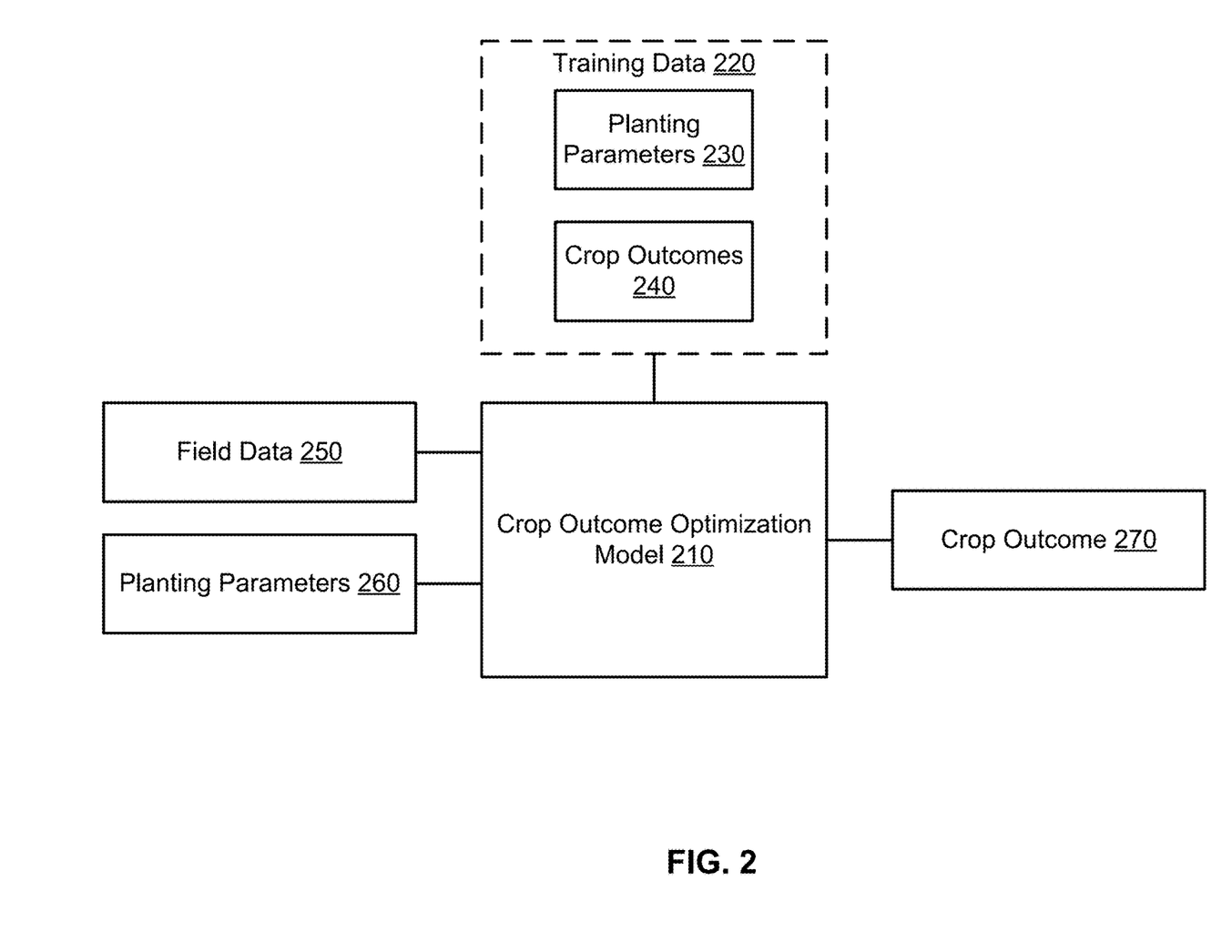
FIG. 2 illustrates the training and application of a machine-learned crop outcome optimization model, according to various embodiments.

FIG. 2 illustrates the training and application of a machine-learned crop outcome optimization model 210, according to various embodiments. In the embodiment of FIG. 2, the crop outcome optimization engine 155 generates and/or accesses training data 220, which includes planting parameter data 230 and crop outcome data 240. Training data 220 can include data from one or more seasons, one or more fields, one or more entities, one or more crop outcomes, or the like. The crop outcome optimization engine 155 can access the training data 220 in advance of training the crop outcome optimization models, in response to a request for a crop outcome optimization model, etc. The advance access enables hypothetical scenario analysis, model inspection, and outcome refinement based on interim outcomes.

The crop outcome optimization engine 155 trains one or more crop outcome optimization models 210, such as a machine-learned model configured to predict a crop outcome for a target portion of a field based on a set of planting parameters. It should be noted that the crop outcome optimization engine 155 can use any of a number of machine learning operations to train the crop outcome optimization model 210. Examples include, but are not limited to, one or more of: a linear support vector machine (linear SVM), boosting for other algorithms (e.g., AdaBoost), a neural network, a logistic regression, a naïve Bayes classifier, a memory based learning, a random forest, a bagged tree, a decision tree, a boosted tree, or a boosted stump.

The trained crop outcome optimization model 210 is applied to field data 250 representative of a portion of a field and planting parameters 260 that will be used to plant the portion of the field. The planting parameters may be identified by the parameter randomization engine 150, a user of the agricultural vehicle 125, or the like. The crop outcome optimization model 210 predicts a crop outcome 270 for the portion of the field based on the field data 250 and the planting parameters 260.

In some embodiments, the crop outcome optimization model 210 may determine a set of planting parameters for planting a portion of the field to attain one or more desired crop outcomes. The determined set of planting parameters may include which planting parameters to control (e.g., row spacing, seed depth, irrigation frequency) and/or which values of the planting parameters should be used (e.g., 24 inch row spacing, 1 inch seed depth, daily irrigation) for the desired crop outcome(s). Desired crop outcomes may be provided by a user of the system environment 100. Alternatively, or additionally, the agricultural vehicle 125 may recommend one or more desired crop outcomes based on data stored in the database 135. Recommendations may reflect a likelihood of attaining a particular crop outcome in a field portion. In some embodiments, the desired crop outcomes are additional model inputs. In some embodiments, the crop outcome optimization model 210 may be trained for one or more particular desired crop outcomes. For example, one crop outcome optimization model may be trained to identify recommended planting parameters when a yield rate and cost to plant are the desired crop outcomes, and a second crop outcome optimization model may be trained to identify recommended planting parameters when a nitrogen efficiency, time to plant, and water quality are desired crop outcomes. Field portions may be planted based on the output of the crop outcome optimization model 210. The crop outcome optimization model 210 may be retrained or validated based on the corresponding results.

Figure 3A:
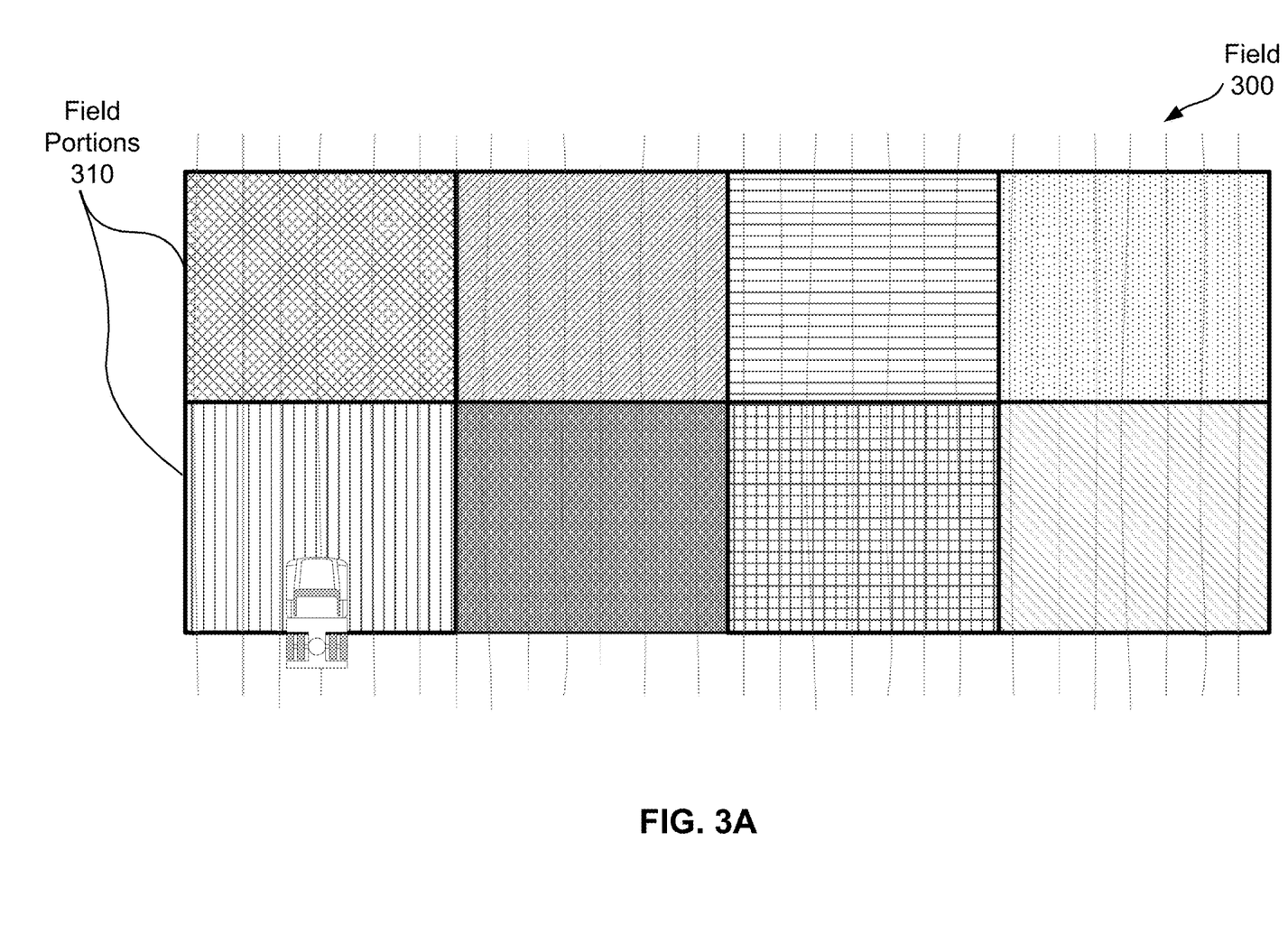
FIG. 3A illustrates a crop outcome optimization map of a first season, according to various embodiments.

FIG. 3A illustrates a crop outcome optimization map of a first season, according to various embodiments. As shown, a field 300 is segmented into different field portions. The agricultural vehicle 125 selects and randomizes a set of planting parameters for each field portion 310, shown by the different fill patterns of each field portion 310. As discussed above, the types of planting parameters selected, the ranges of values randomized for planting parameters, etc., may be based on recommendations from the agricultural vehicle 125 and/or user preferences. For example, a user may want most field portions 310 planted within a narrow range of planting parameter values and experiment values outside of the narrow range in only a few field portions 310 if the model is updated to account for such non-random interventions. The field portions 310 are planted according to the selected and randomized planting parameters. Crop outcomes for each of the field portions 310 are obtained. One or more crop outcome optimization models may be trained based on the selected planting parameters, the randomized values of the planting parameters, the crop outcomes of each of the field portions 310, and any desired crop outcomes associated with one or more field portions.

Figure 3B:
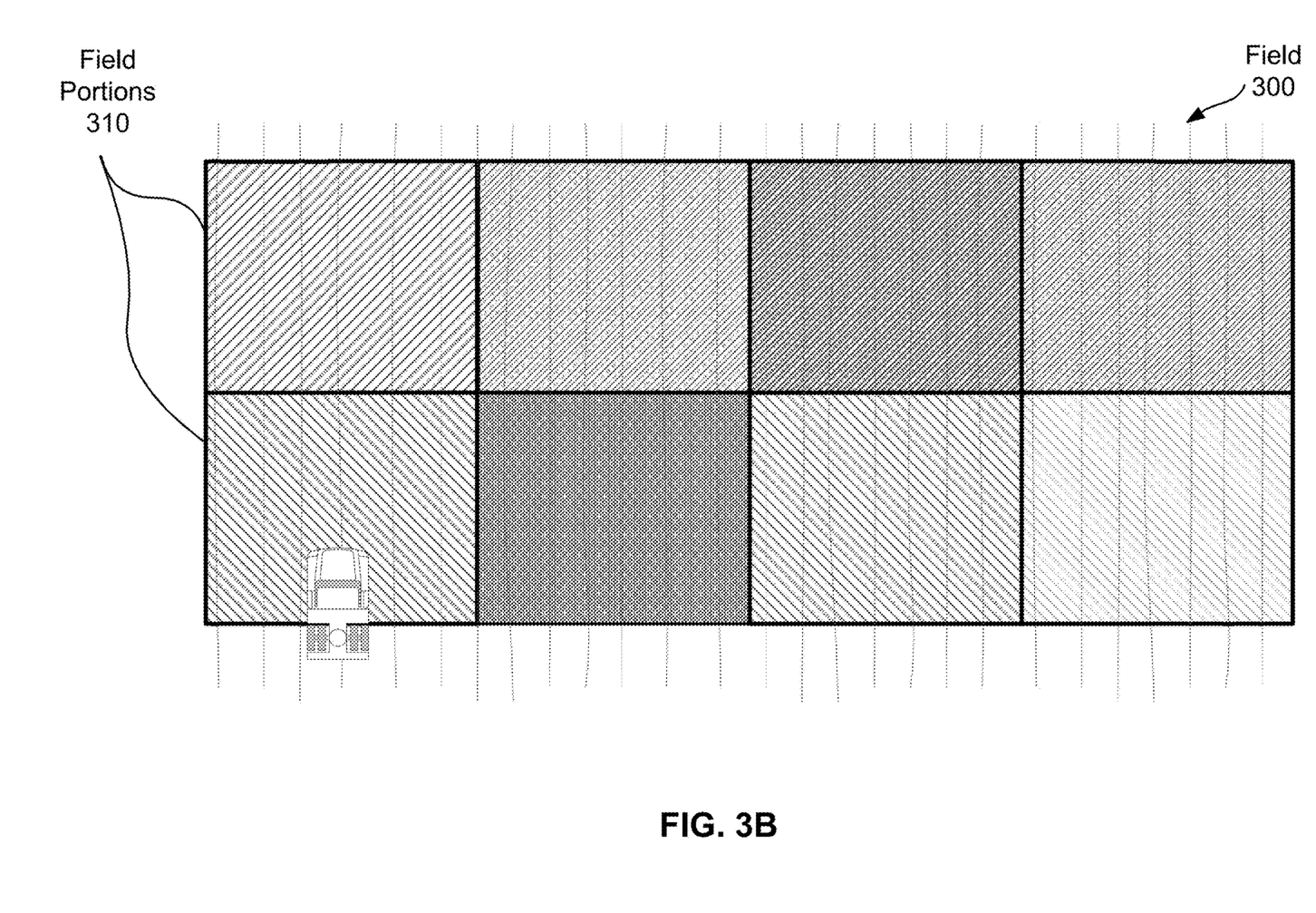
FIG. 3B illustrates a crop outcome optimization map of a second season, according to various embodiments.

FIG. 3B illustrates a crop optimization map of a second season or iteration, according to various embodiments. The second season is subsequent to the first season described with reference to FIG. 3A. In the illustration shown, in the second season, the field 300 is segmented in a similar manner to that in the first season. However, the field 300 may be segmented differently each season. For the second season, a set of planting parameters are identified by the crop outcome optimization model trained with data from the first season. The crop outcome optimization model may select planting parameters for each field portion 310 based on the crop outcomes of each field portion from preceding seasons, the corresponding planting parameters, and/or one or more desired crop outcomes for each field portion 310. The degree of randomization of the planting parameters may differ from that of the first season. For example, the randomization may be reduced based on the crop outcome data from the first season. Randomization may be reduced by narrowing the distribution of planting parameters, selecting under-represented values less frequently, excluding some portion from randomization, or the like. As shown in FIG. 3B via the fill patterns of the field portions 310, the distribution of planting parameters in the second season is less wide than the distribution of planting parameters in the first season. Crop outcomes may be obtained for the field portions 310. The crop outcome data may be used to retrain one or more crop outcome optimization models.

Figure 4:
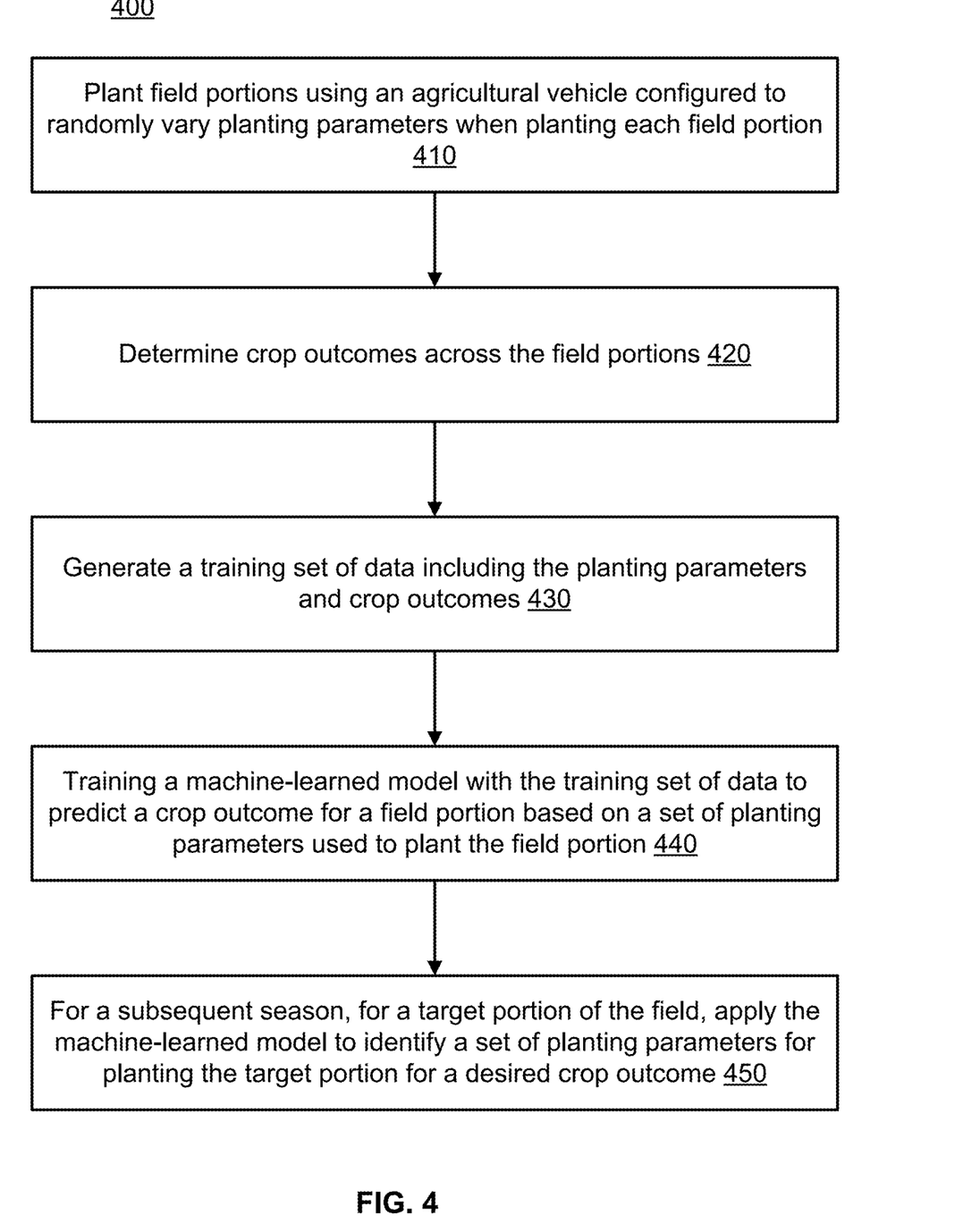
FIG. 4 is a flow chart illustrating a method for planting a field for crop optimization, according to various embodiments.

FIG. 4 is a flow chart illustrating a method 400 for planting a field for crop optimization, according to various embodiments. In the method 400 shown, an agricultural vehicle, such as an autonomous vehicle, configured to randomly vary planting parameters before or during planting a field, plants 410 portions of a field. Portions of the field may be identified by segmenting the field. Field segmentation may be based on user preferences, geography data, topography data, weather data, crop types, etc. The field may be segmented manually; automatically, using one or more models; or the like. In some embodiments, each portion of the field may be associated with the same crop type being planted within the portion of the field, a set of similar characteristics, or the like.

In some embodiments, each portion of the field includes sub-portions. In these embodiments, each sub-portion may be associated with a set of field characteristics, and the sets of field characteristics across each portion of the field may be substantially homogenous. Within a given portion ("block"), the planting parameters may be randomly varied for each sub-portion.

The planting parameter values may be varied randomly. The values may be discrete, continuous, enumerated, or a combination thereof. For example, the values of a tillage tool type may be discrete while the values of the amount of irrigation applied may be continuous. Further, the range of the values may be based on a number of considerations, including, but not limited to, historical data, user preferences, machine constraints, environmental constraints, jurisdictional requirements, crop type, or the like. The planting parameters may be varied in any suitable manner. For example, a variation of the planting parameters may be evenly distributed among a range of values, distributed according to a Gaussian distribution, based on interactions of interest, or the like. Further, in some embodiments, under-represented values associated with a particular planting parameter may be selected more frequently and/or less frequently than other values of the planting parameter. For example, if a typical planting depth is between four centimeters and six centimeters, the agricultural vehicle may be encouraged to select a planting depth outside of that range for one or more portions of the field (e.g., select a planting depth of one centimeters, two centimeters, three centimeters, seven centimeters, etc.) in a first season. In a subsequent season, the agricultural vehicle may be configured to select under-represented values less frequently. For example, as an optimal range of a planting depth is identified over time, the agricultural vehicle may be configured to select values close to and/or within the identified optimal range more frequently than it selects values outside of the identified optimal range. If the parameter value cannot be held perfectly constant across the whole sample, e.g. due to transient response time, a representative control command can be substituted, understanding that deviating from the prescribed setpoint will add noise to the statistical tolerance of the outcomes.

For each portion of the field, a crop outcome 420 is determined across a respective portion. Crop outcomes may be determined manually, with an agricultural vehicle, via modeling, or the like. A training set of data is generated 430 that comprises the varied plant parameters and the determined crop outcome for each of the portion of the field. In some embodiments, the training set of data may further include any combination of historical fleet data, historical operation data, historical data from related machines, historical weather data, weather forecast data, field data from previous operations and/or experiments, historical geography data, or the like. A machine-learned model is trained 440 with the training set of data. The machine-learned model is configured to predict a crop outcome for a portion of the field based on a set of planting parameters used to plant the portion of the field.

For a subsequent season, for a target portion of the field, the machine-learned model is applied 450 to identify a set of planting parameters for planting the target portion of the field for one or more desired crop outcomes. Desired crop outcomes may include, but are not limited to, a desired yield, desired yield rate, desired cost to plant, desired amount of fertilizer used, desired amount of herbicide used, desired amount of pesticide used, desired amount of irrigation used, desired time to harvest, desired soil condition, desired nitrogen efficiency, desired environmental impact, a desired crop quality, a desired profit or revenue, a desired land utilization type or quantity, a financial subsidy, and/or desired water quality.

The target portion of the field may be planted using the identified set of planting parameters. In some embodiments, the target portion is planted using a set of randomly varied parameters that are based on the identified set of planting parameters. A value distribution of the planting parameters in the set of randomly varied planting parameters may be narrower than a distribution of planting parameters associated with a preceding season, wider than a distribution of planting parameters associated with a preceding season, as wide as a distribution of planting parameters associated with a preceding season, or the like. Alternatively, or additionally, the set of randomly varied parameters may be distributed according to a Gaussian distribution or response surface design like central composite or Box-Behnken. In these embodiments, the Gaussian distribution may be narrower than a Gaussian distribution of planting parameters associated with a preceding season, wider than a Gaussian distribution of planting parameters associated with a preceding season, similar to a Gaussian distribution of planting parameters associated with a preceding season, or the like. In addition, in a subsequent season, under-represented values of the planting parameters in the set of randomly varied planting parameters may be less likely to be selected than in a preceding season, more likely to be selected than in a preceding season, or as likely to be selected.

In some embodiments, a second training set of data is generated based on the outcome data associated with a subsequent season for one or more portions of the field. The machine-learned model may be retrained and/or validated using the second set of data.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for cultivating a field, comprising:
   planting each of a plurality of portions of the field, each portion of the field planted using one or more agricultural vehicles configured to randomly vary each of a plurality of planting parameters before or during planting the portion of the field, the planting parameters including at least a planting depth, a planting spacing, a type of treatment applied when planting, and an amount of treatment applied when planting;
   determining, for each portion of the field, a resulting crop outcome across the portion of the field;
   generating a training set of data comprising the varied planting parameters and the determined crop outcome for each of the portions of the field;
   training a machine-learned model using the generated training set of data, the machine-learned model configured to predict a crop outcome for a portion of the field based on a set of planting parameters used to plant the portion of the field;
   for a subsequent iteration, for a target portion of the field, applying the machine-learned model to identify a set of planting parameters for planting the target portion of the field to optimize a desired crop outcome;
   identifying, for each of a plurality of sub-portions of the target portion, a set of randomly varied planting parameters based on the identified set of planting parameters for planting the target portion of the field; and
   planting, in the subsequent iteration and for each of the plurality of sub-portions of the target portion, the sub-portion with the corresponding set of randomly varied planting parameters.

2. The method of claim 1, wherein the agricultural vehicle is an autonomous vehicle.

3. The method of claim 1, wherein each portion of the plurality of sub-portions is associated with a set of field characteristics, and wherein sets of field characteristics across each portion of the field are substantially homogenous.

4. The method of claim 1, wherein the plurality of planting parameters further includes at least one of: a seed rate, a seed type, an amount of irrigation, an environmental condition, a sun exposure, a fertilizer type and/or rate, an herbicide type and/or rate, a pesticide type and/or rate, a soil composition, a land use type, a crop rotation, or a cover crop type.

5. The method of claim 1, wherein each portion of the field is associated with a same crop type being planted within the portion of the field.

6. The method of claim 1, wherein the desired crop outcome includes at least one of: a desired yield, a desired yield rate, a desired cost to plant, a desired amount of fertilizer used, a desired amount of herbicide used, a desired amount of pesticide used, a desired amount of irrigation used, a desired time to harvest, a desired soil condition, a desired nitrogen efficiency, a desired environmental impact, a desired water quality, a land use, or a financial subsidy.

7. The method of claim 1, wherein a value distribution of planting parameters in the plurality of sets of randomly varied planting parameters for the plurality of sub-portions is refined based on planting parameter outcomes associated with a preceding or related iteration.

8. The method of claim 1, further comprising:
   generating a second training set of data, the second training set of data comprising outcome data associated with the subsequent iteration for one or more portions of the field; and
   retraining the machine-learned model using the generated second training set of data.

9. The method of claim 1, wherein values of the varied planting parameter values are evenly distributed among a range of values.

10. The method of claim 1, wherein a variation of the varied planting parameters is distributed according to a Gaussian distribution, a face-centered cubic design, or a Box-Behnken design.

11. The method of claim 1, further comprising:
planting, in a subsequent iteration, the target portion of the field using a set of randomly varied planting parameters, wherein the set of randomly varied planting parameters are based on the identified set of planting parameters, and wherein a Gaussian distribution of the planting parameters in the set of randomly varied planting parameters is refined based on planting parameter outcomes observed in a preceding iteration.

12. The method of claim 1, wherein, for at least one planting parameter of the plurality of planting parameters, the agricultural vehicle is more likely to select underrepresented values of at least one planting parameter when planting each of the plurality of portions of the field.

13. The method of claim 12, further comprising:
planting, in the subsequent iteration, the target portion of the field using a set of randomly varied planting parameters, wherein the set of randomly varied planting parameters are based on the identified set of planting parameters, and wherein sub-optimal values of the planting parameters in the set of randomly varied planting parameters are less likely to be selected than in a preceding iteration.

14. A non-transitory computer-readable medium comprising memory with instructions encoded thereon, the instructions, when executed by one or more processors, causing the one or more processors to perform operations, the instructions comprising instructions to:
plant each of a plurality of portions of a field, each portion of the field planted using an agricultural vehicle configured to randomly vary each of a plurality of planting parameters when planting the portion of the field, the planting parameters including at least a planting depth, a planting spacing, a type of treatment applied when planting, and an amount of treatment applied when planting;
determine, for each portion of the field, a resulting crop outcome across the portion of the field;
generate a training set of data comprising the varied planting parameters and the determined crop outcome for each of the portions of the field;
train a machine-learned model using the generated training set of data, the machine-learned model configured to predict a crop outcome for a portion of the field based on a set of planting parameters used to plant the portion of the field;
for a subsequent iteration, for a target portion of the field, apply the machine-learned model to identify a set of planting parameters for planting the target portion of the field for a desired crop outcome;
identify, for each of a plurality of sub-portions of the target portion, a set of randomly varied planting parameters based on the identified set of planting parameters for planting the target portion of the field; and
plant, in the subsequent iteration and for each of the plurality of sub-portions of the target portion, the sub-portion with the corresponding set of randomly varied planting parameters.

15. The non-transitory computer-readable medium of claim 14, wherein the instructions further comprise instructions to:
plant, in the subsequent iteration, the target portion of the field using a set of randomly varied planting parameters, wherein the set of randomly varied planting parameters are based on the identified set of planting parameters, and wherein a value distribution of the planting parameters in the set of randomly varied planting parameters is refined based on outcomes associated in a season.

16. The non-transitory computer-readable medium of claim 14, wherein a variation of the varied planting parameters is distributed according to a Gaussian distribution, face centered cubic design, or Box-Behnken design.

17. An agricultural vehicle comprising one or more hardware processors and a non-transitory computer-readable storage medium storing executable instructions that, when executed by the one or more hardware processors, cause the agricultural vehicle to perform steps comprising:
planting each of a plurality of portions of a field, each portion of the field planted using an agricultural vehicle configured to randomly vary each of a plurality of planting parameters when planting the portion of the field, the planting parameters including at least a planting depth, a planting spacing, a type of treatment applied when planting, and an amount of treatment applied when planting;
determining, for each portion of the field, a resulting crop outcome across the portion of the field;
generating a training set of data comprising the varied planting parameters and the determined crop outcome for each of the portions of the field;
training a machine-learned model using the generated training set of data, the machine-learned model configured to predict a crop outcome for a portion of the field based on a set of planting parameters used to plant the portion of the field;
for a subsequent iteration, for a target portion of the field, applying the machine-learned model to identify a set of planting parameters for planting the target portion of the field for a desired crop outcome;
identifying, for each of a plurality of sub-portions of the target portion, a set of randomly varied planting parameters based on the identified set of planting parameters for planting the target portion of the field; and
planting, in the subsequent iteration and for each of the plurality of sub-portions of the target portion, the sub-portion with the corresponding set of randomly varied planting parameters.

18. The agricultural vehicle of claim 17, the executable instructions further causing the agricultural vehicle to perform steps comprising:
planting, in the subsequent iteration, the target portion of the field using a set of randomly varied planting parameters, wherein the set of randomly varied planting parameters are based on the identified set of planting parameters, and wherein a value distribution of the planting parameters in the set of randomly varied planting parameters is narrower than a distribution of planting parameters associated with a preceding iteration.

19. The agricultural vehicle of claim 17, the executable instructions further causing the agricultural vehicle to perform steps comprising:
planting, in the subsequent iteration, the target portion of the field using a set of randomly varied planting parameters, wherein the set of randomly varied planting parameters are based on the identified set of planting parameters, and wherein a distribution of the planting parameters in the set of randomly varied planting parameters is refined based on planting parameters associated with a preceding iteration.

* * * * *